UNITED STATES PATENT OFFICE.

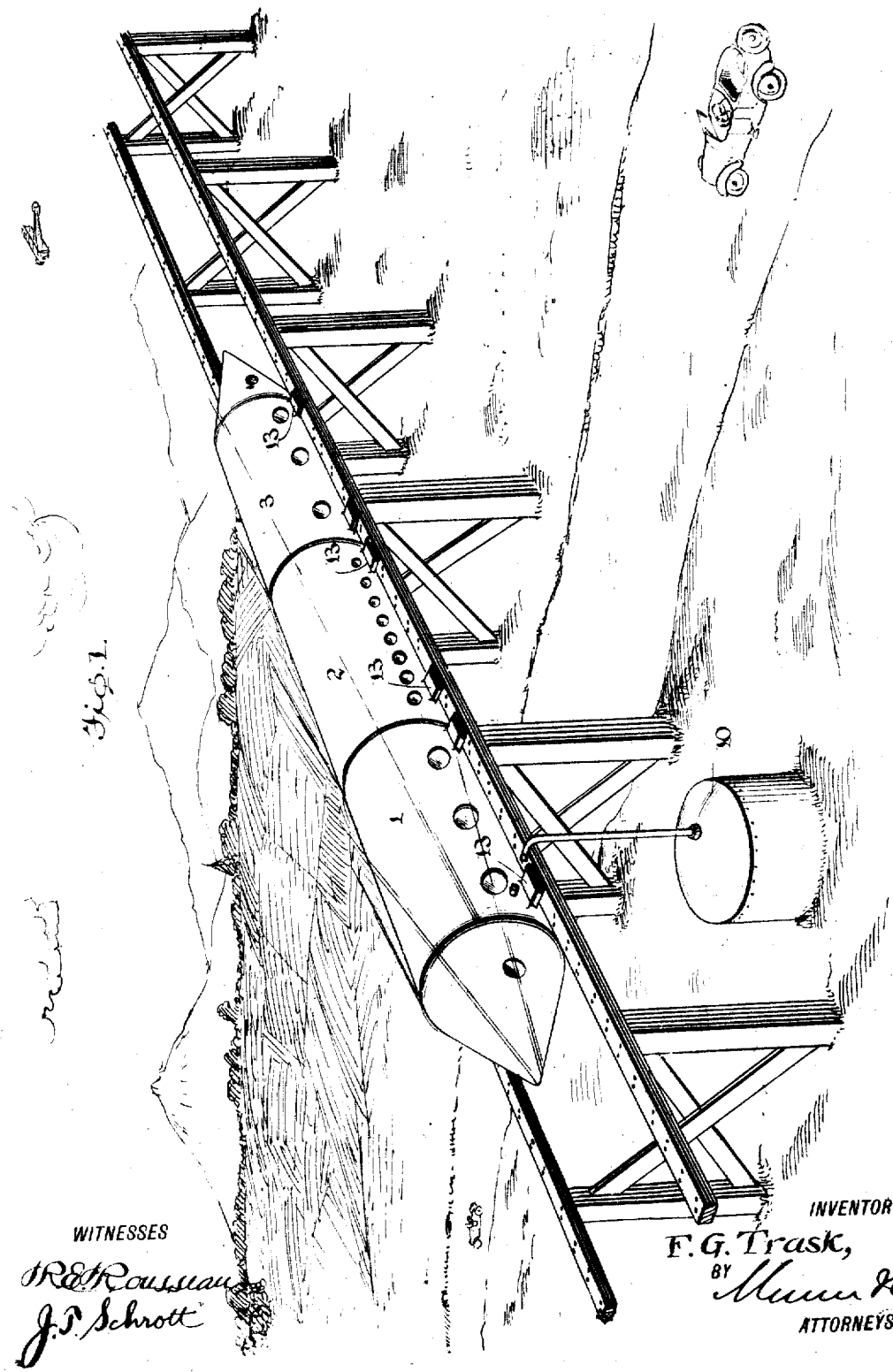

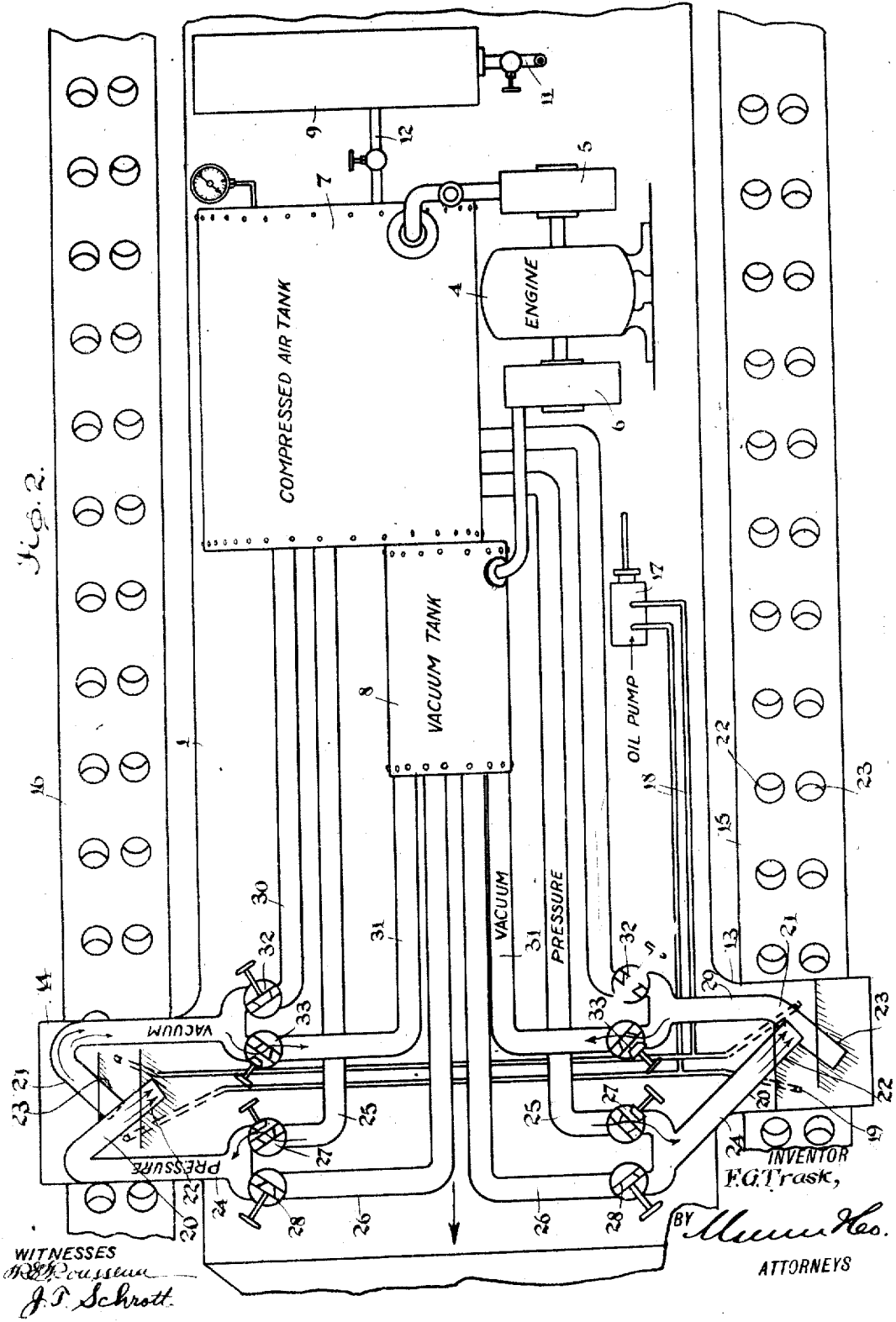

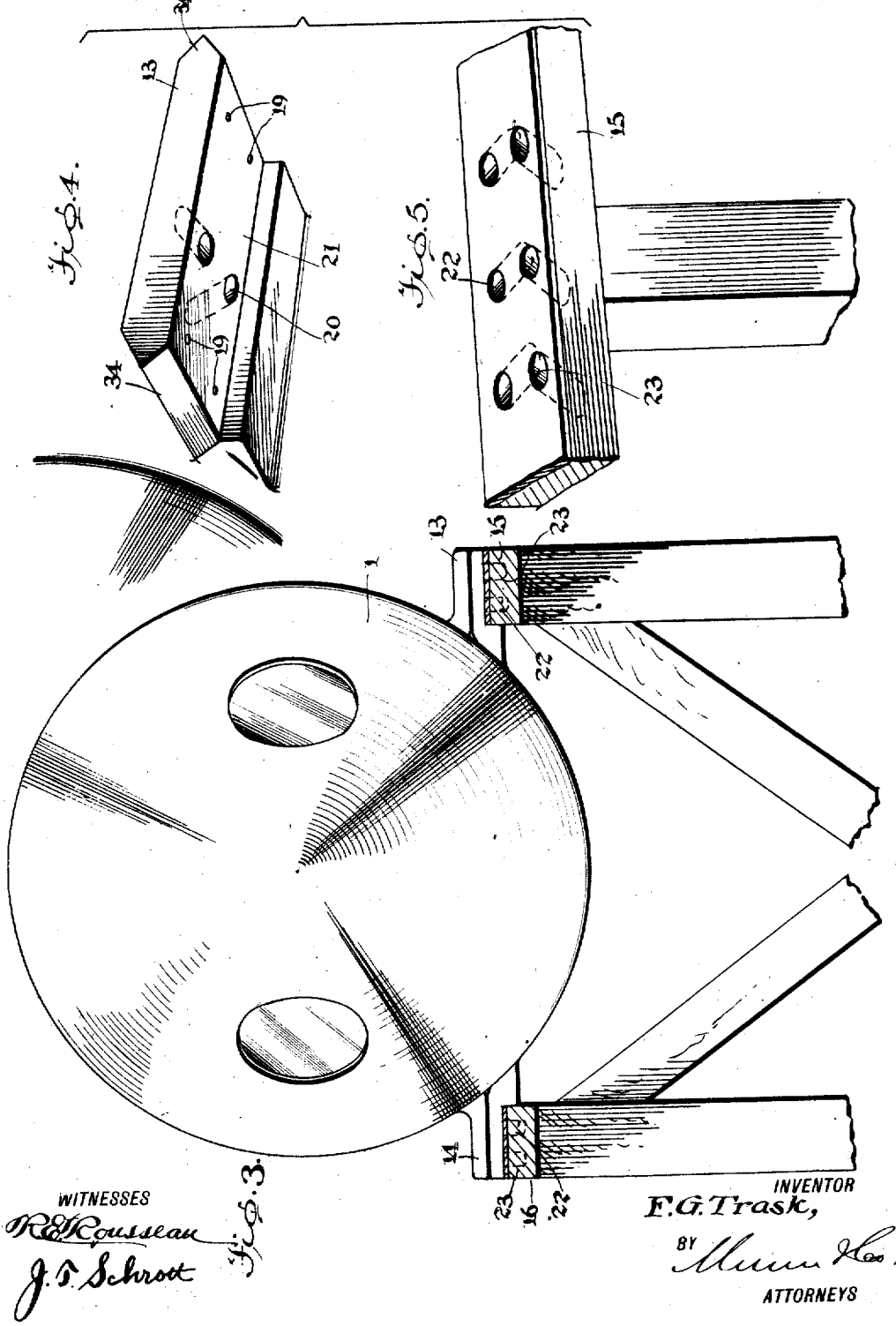

FRANK GEORGE TRASK, OF ROSS, NORTH DAKOTA.

COMPRESSED-AIR AND VACUUM RAILWAY.

1,411,507.   Specification of Letters Patent.   Patented Apr. 4, 1922.

Application filed December 17, 1921. Serial No. 523,061.

*To all whom it may concern:*

Be it known that I, FRANK GEORGE TRASK, a citizen of the United States, and a resident of Ross, in the county of Mountrail and State of North Dakota, have invented certain new and useful Improvements in Compressed-Air and Vacuum Railways, of which the following is a specification.

My invention relates to improvements in rapid transit railways and it consists in the constructions, combinations and mode of operation herein described and claimed.

An object of the invention is to provide means for propelling a vehicle by discharging compressed air against abutments along a track on which the vehicle runs.

A further object is to provide a novel propelling means including the combination of an air pressure and a vacuum system, the former operating to move a vehicle forwardly, the latter operating to keep certain ports or abutments along a track clean.

Other objects and advantages will appear in the following specification, reference being had to the accompanying drawings, in which:

Fig. 1 is a perspective view of the improved railway,

Fig. 2 is a diagram illustrating the mode of propulsion of one of the train vehicles, Fig. 3 is a front elevation, the tracks being shown in section, Fig. 4 is an inverted perspective view of one of the bearing plates, and Fig. 5 is a detail perspective view of a section of track.

The train (Fig. 1) is composed of a number of vehicles 1, 2, and 3. The first vehicle, which would correspond with the engine of an ordinary passenger train, contains an engine 4 (Fig. 2) which operates an air compressor 5 and an exhaust fan 6. The former stores air under pressure in a tank 7. The latter exhausts air from a tank 8 which for convenience is termed a vacuum tank.

The supply of air in the tank 7 may be augmented by filling a storage tank 9 from a compressed air reservoir 10 along the road. The tank 9 has a valved connection 11 (Fig. 2) which extends to the outside of the vehicle 1 (Fig. 1) so that a connection with the reservoir 10 may be had. A valved connection 12 transfers compressed air from the tank 9 to the tank 7.

Each vehicle has a number of bearing plates 13 and 14 on the respective sides. These bearing plates slide on the surfaces of rails 15 and 16. An oil pump 17 forces oil through conduits 18 to outlets 19 beneath the bearing plate for the purpose of lubricating the rails. Each bearing plate has diagonal ports 20 and 21. They are disposed at angles of 45° but extend in opposite directions as shown in Figs. 2 and 4. Air under pressure is discharged through one set of ports when the train is intended to go in one direction and air is drawn through the other set of ports when the train goes in the same direction. The same is true when the train is intended to run in the opposite direction.

The ports 20 and 21 of each bearing plate 13 and 14 cooperate with recesses or abutments 22 and 23 in each of the rails 15 and 16. By discharging highly compressed air into the abutment recesses 22 a forward propulsion of the vehicle (1 in Fig. 2) is obtained. By exhausting air from the abutment recesses 23, oil and other accumulations are withdrawn and the forward propulsion of the vehicle aided to some extent. In order to propel the vehicle in the opposite direction, the passage of exhausting air and air under compression is reversed. In this event, the abutment recesses 23 become the pressure abutments, while 22 become the so-called vacuum abutments.

A system of valves and pipes controls the air. Each pipe 24 which leads to a pressure port 20, branches into pipes 25 and 26 respectively having valves 27 and 28. Similarly, the pipes 29 of the "vacuum" ports 21 merge into branches 30 and 31 which have valves 32 and 33 respectively.

All pipes 25 and 30 lead to the compressed air tank 7. All pipes 26 and 31 lead to the vacuum tank 8. It is only a matter of opening and closing the proper valves 27, 28, etc., in order to produce the effect described above. In the present instance, the valves 27 are open, 28 closed, 32 closed and 33 open. The diagram in Fig. 2 illustrates the result of this arrangement of the valves.

Air under pressure is discharged through ports 20 against the bottom of the abutment recesses 22 in the rails 15 and 16, while air is withdrawn from the abutment recesses 23 and the zone surrounding them, through the ports 21. It is to be observed that abutment recesses 22 and 23 of each rail are in transverse alinement in respect to each other but that pairs of the recesses are staggered in respect to each other in the two rails. A pair of recesses 22 and 23 of the rail 15 will come between two pairs of recesses 22 and 23 of the rail 16.

This arrangement lessens the period through which the ports 20 and 21 traverse solid surfaces of the rails. The leading edges of the bearing plates are beveled at 34 as in Fig. 4, thus aiding in crossing obstructions should any fall upon the track. The track may be made in any desirable manner, either of solid iron, or of wood with a metallic facing plate, as illustrated for example in Fig. 5. Neither the particular construction of the track, the trestle work by which it is supported and braced, the construction of the vehicles, or the construction of the machinery inside of the first vehicle 1, is material to the invention disclosed as obviously the invention may be embodied in a variety of ways, without departing from the spirit.

I claim:—

1. A railway comprising a vehicle on a track, and means for discharging compressed air from the vehicle against the track to move the vehicle forwardly by virtue of the reaction.

2. A railway comprising a vehicle, a track on which it runs, having means offering abutment; and means for discharging compressed air from the vehicle against the abutment.

3. A railway comprising a vehicle, a track with recesses, bearing means extending from the vehicle and sliding on the track, and means for discharging compressed air through said bearing means into the recesses of the track.

4. A railway comprising a track with recesses disposed in opposite directions, a vehicle, bearing means carried thereby sliding on the track and having ports disposed to correspond with the recesses, and means carried by the vehicle for either forcing compressed air through a port and into a corresponding recess to cause the vehicle to move in one direction and withdraw air from the other port and vice versa.

5. A railway comprising a vehicle with bearing means having ports disposed in opposite directions, means for forcing compressed air through one port and exhausting air from the other port and vice versa, and a rail on which the bearing means slides having a series of recesses disposed in one direction for one port and a series of recesses disposed in the opposite direction for the other port.

6. A railway comprising a track with series of recesses disposed in opposite directions, a vehicle with bearing means sliding on the track and having ports disposed in corresponding directions, means for forcing compressed air through one port to impact the base of one series of recesses and move the vehicle forwardly, and means for exhausting air from the other port and corresponding recesses to remove accumulations of oil, etc. from the track.

7. A railway comprising a vehicle with bearing plates, each having ports disposed in opposite directions; a vacuum tank having a valved connection to each port, and a compressed air reservoir having a valved connection to each port.

8. A railway including a track with a longitudinal series of recesses disposed at one angle, and a companion longitudinal series of recesses disposed at another angle.

9. A railway including two tracks each with longitudinal series of recesses disposed at opposite angles, the recesses of one track coming midway of the recesses of the other track to form a staggered arrangement.

FRANK GEORGE TRASK.